Sept. 29, 1964 C. L. EKSERGIAN 3,150,745
SPOT TYPE DISC BRAKE
Filed June 22, 1962 2 Sheets-Sheet 1
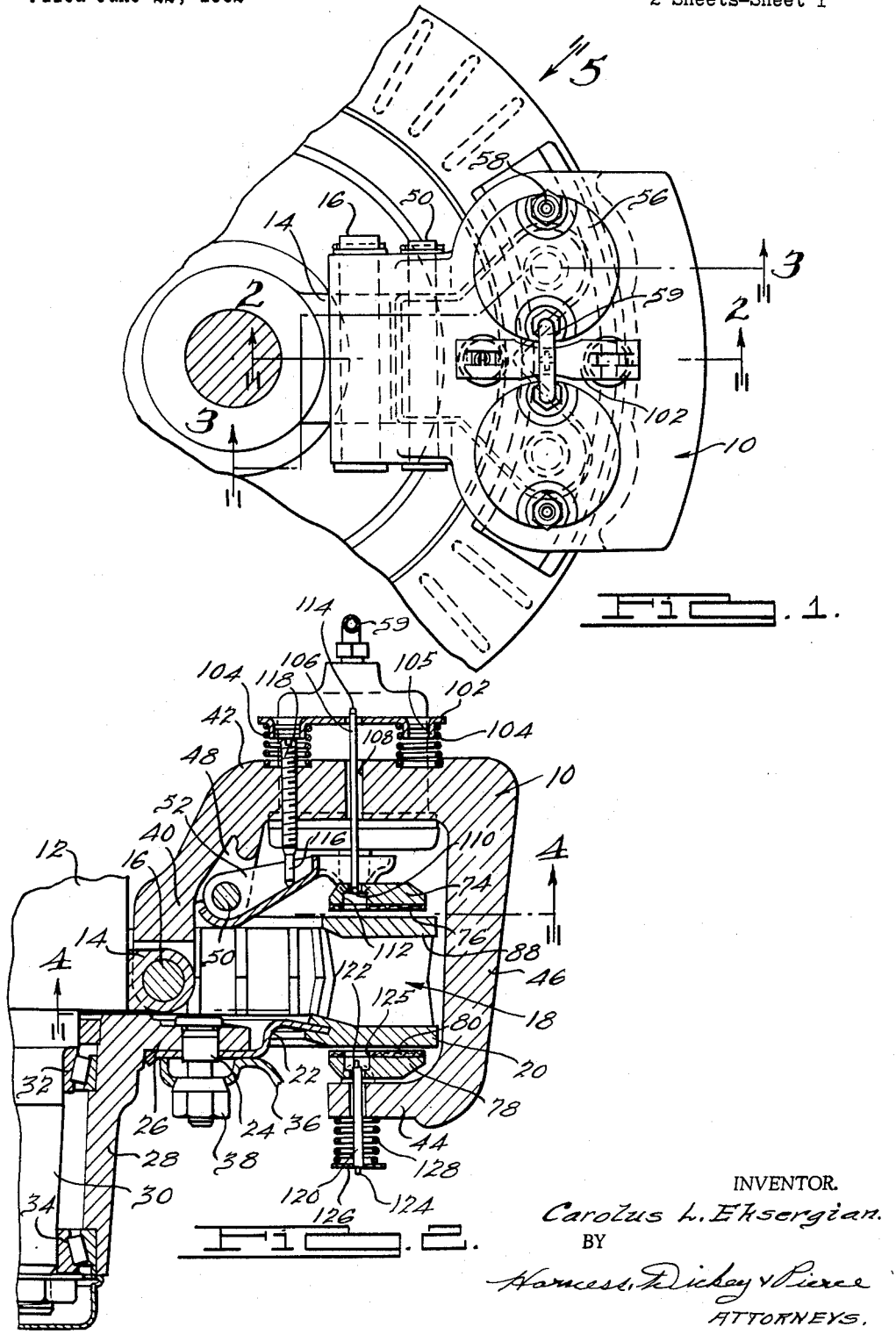
INVENTOR.
Carolus L. Eksergian.
BY
Harness, Dickey & Pierce
ATTORNEYS.

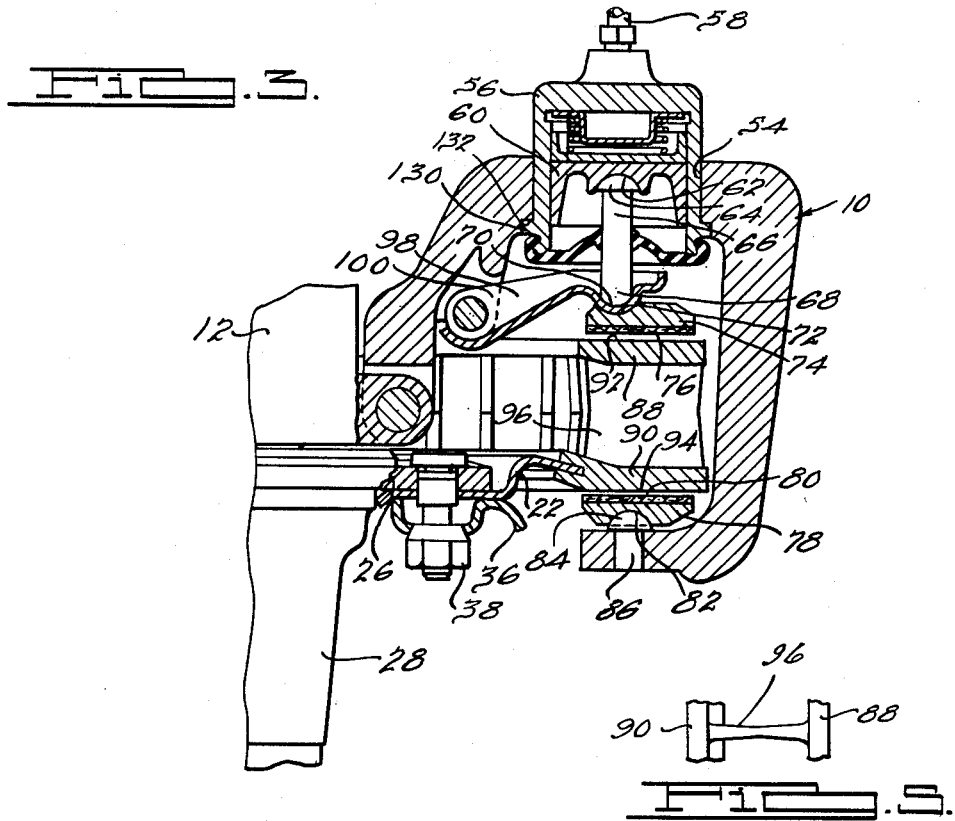
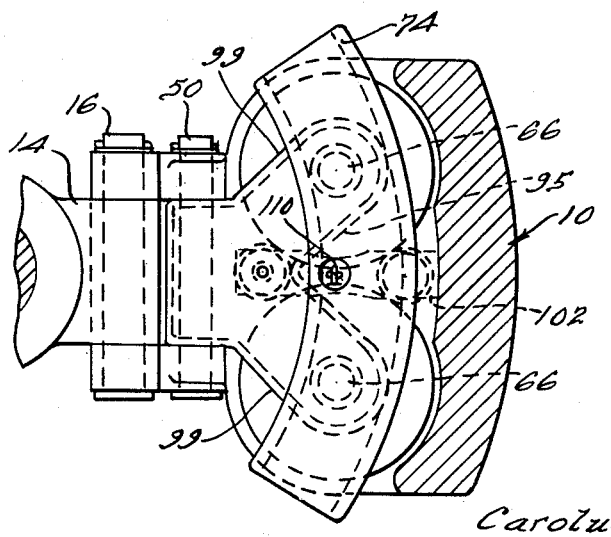

United States Patent Office 3,150,745
Patented Sept. 29, 1964

3,150,745
SPOT TYPE DISC BRAKE
Carolus L. Eksergian, Media, Pa., assignor to Kelsey-Hayes Company, Romulus, Mich., a corporation of Delaware
Filed June 22, 1962, Ser. No. 204,499
5 Claims. (Cl. 188—73)

This invention relates to brakes and particularly to an improved disc brake construction.

It is an object of the present invention to provide a disc brake having improved and novel means for absorbing the braking torque with a minimum of frictional resistance to the advancement and retraction of the brake shoes.

It is another object of the present invention to provide a disc brake construction in which the brake shoes or friction members are maintained in full braking engagement with the disc despite any tendency of the disc to distort as a result of mechanical stress or thermal expansion.

It is another object of the present invention to provide a disc brake construction of the above character having means for effectively maintaining the brake shoes in a retracted position with respect to the braking surfaces of the disc when the brakes are not being applied.

Still another object of the present invention is to provide a disc brake construction of the above character having improved heat dissipation characteristics.

Other objects and advantages of the present invention include the provision of a disc brake construction which is low in cost, rugged in construction, possesses a long, useful life and is highly efficient in performance.

These and other objects of the present invention will become apparent from the following detailed description taken in conjunction with the accompanying drawings wherein:

FIGURE 1 is a fragmentary side elevational view of a disc brake embodying the principles of the present invention;

FIG. 2 is a sectional view of the structure illustrated in FIGURE 1 taken along the line 2—2 thereof and looking in the direction of the arrows;

FIG. 3 is a sectional view of the structure illustrated in FIGURE 1 taken along the line 3—3 thereof and looking in the direction of the arrows;

FIG. 4 is a sectional view of the structure illustrated in FIG. 2 taken along the line 4—4 thereof and looking in the direction of the arrows; and FIG. 5 is a fragmentary view of the structure illustrated in FIGURE 1 looking in the direction of the arrow 5.

Referring now to the drawings, the numeral 10 indicates a brake housing or caliper which is pivotally mounted on a stationary portion of the vehicle, represented herein by a spindle or axle forging 12 having an upstanding boss 14 supporting a pivot pin 16. The caliper 10 extends radially outwardly from its point of support to embrace a brake disc member indicated generally by the number 18. The disc 18 comprises a cast iron portion 20 which is integrally connected to the radially outer end of a spider or body portion 22. The body portion 22 is suitably apertured to receive a plurality of studs 24 carried by the flange 26 of a hub 28. The hub 28 is centrally open to receive a spindle 30 integrally formed on the spindle forging 12. Anti-friction bearings 32 and 34 are interposed between the spindle 30 and the inside diameter of the hub 28 whereby the hub is supported for rotation relative to the spindle. A wheel is also mounted on the hub and a fragmentarily illustrated wheel body or spider is indicated at 36 with the studs 24 extending through apertures therein. A nut 38 is screwed onto each of the threaded extremities of the studs 24 and is drawn against the wheel body 36 to clamp the wheel body and the body portion 22 of the disc tightly against the face of the hub flange 26.

As may be seen in FIG. 2, the caliper 10 includes a slotted base portion 40, a radially extending wall 42 connected to the base 40, a radially extending wall 44 on the opposite side of the disc 18 from the wall 42 and a bridge portion 46 interconnecting the walls 42 and 44 and disposed at the radially outermost end of the caliper 10. The caliper 10 is also formed with a pair of bosses 48 disposed at the juncture of the base 40 and the wall 42. The bosses 48 extend toward the disc 18 and are spaced apart to support a pivot pin 50 extending therebetween. A torque plate 52 is mounted on the pivot pin 50 for pivotal movement toward and away from the disc 18 on one side thereof.

The caliper wall 42 is provided with a pair of spaced apertures 54, each of which snugly receives a cylinder 56. One of the cylinders 56 is connected to one end of a hydraulic conduit 58 adapted to be connected at its other end to a suitable source of hydraulic fluid pressure such as a brake master cylinder (not shown). Another conduit 59 provides fluid communication between the cylinders 56. A separate piston 60 is disposed in each of the cylinders 56. The structure of each of the pistons 60 is identical and each has a segmentally spherical recess 62 on the forward face thereof which receives the complementary shaped head 64 of a piston rod 66. The end 68 of each piston rod 66 remote from the head 64 engages a separate segmentally spherical recess 70 formed in the torque plate 52. The two recesses 70 are spaced apart in a circumferential direction. The material of the torque plate 52 defining the recesses 70 is of concavo-convex shape. The convex sides opposite the recesses 70 seat in segmentally spherical recesses 72 formed in a friction member or brake shoe 74 to define interengaging abutment means for the transfer of torque from the brake shoe 74 to the torque plate 52. The brake shoe 74 is positioned between one side of the disc 18 and the wall 42 of the caliper and has a friction lining 76 bonded on the side thereof adjacent the disc 18. A second brake shoe or friction member 78 is positioned between the wall 44 and the opposite side of the disc 18. The brake shoe 78 has a friction lining 80 bonded on the face thereof adjacent the disc 18 and is provided with a pair of segmentally spherical recesses 82 on the side thereof adjacent the caliper wall 44. Segmentally spherical heads 84 of studs 86 carried by the wall 42 are received within the brake shoe recesses 82. It will thus be seen that both of the brake shoes 74 and 78 are free to pivot about axes intersecting the centers about which the surfaces of the recesses 72 and 82, respectively, are generated.

Referring now to the details of construction of the brake disc 18, the cast portion 20 of the disc is provided with a pair of axially spaced annular wall portions 88 and 90 having flat brake shoe engageable surfaces 92 and 94, respectively. Interconnecting the wall portions 88 and 90 are a plurality of circumferentially spaced vanes or blades 96. The structure of the disc is such that as it is rotated the vanes 96 impel air radially outwardly through the spaces therebetween for the purpose of cooling the disc and dissipating the heat which is generated during a braking operation. Of course, the vanes 96 also structurally interconnect the wall portions 88 and 90.

The torque plate 52 is preferably formed as a sheet metal stamping and generally possesses a Y-shaped configuration, as seen in side elevation. A V-shaped notch or recess 95 is formed in the radially outer end of the torque plate, while a flat planar base portion 98 of the torque plate is provided with two radially outwardly diverging arm portions 99 disposed on opposite sides of the notch 95. A pair of side walls 100 extend along opposite sides of the torque plate throughout the radial length of the base portion 98 and the arms 99 and are provided with aligned openings for the reception of the pivot pin 50 on which the torque plate 52 is pivotally supported. It will be seen that the torque plate is of substantially greater dimension in a plane transverse to the axis of rotation than it is in axial thickness. Thus, while the torque plate can absorb great torque loads, the two arm portions 99 are free to flex in an axial direction relative to one another to accommodate distortion of the braking surface 92 out of a true transverse plane. It is thus assured that the brake shoe friction lining 76 will at all times maintain full braking contact with the braking surface 92 upon the application of the brakes.

The return mechanism for the brake shoe 74 includes a stamped sheet metal plate 102 which is biased in a direction away from the disc 18 by a pair of coil springs 104 seated between the wall 42 and locating bosses or sleeves 105 formed on the plate 102. A pin 106 extends from the plate 102 through an opening 108 in the housing wall 42, through the notch 95 of the torque plate 52 and into a recess 112 formed in the brake shoe 74. The pin 106 has an elongated head 110 seated against the bottom of the recess 112 and rotated 90° with respect to an elongated opening through which it is inserted into the recess 112. An elongated head 114 is formed at the opposite end of the pin 106 and bears against the outer side of the plate 102. Thus, the springs 104 are effective to bias the brake shoe 74 in a direction away from the adjacent braking surface 92 of the disc 18. In so doing, the torque plate 52 is also biased away from the disc 18. The extent of the retractive movement of the brake shoe 74 is limited by a pin 116 which is integrally formed on the end of a screw 118. Screw 118 may be adjusted to vary the normal retracted position of the brake shoe 74 and establish a desired clearance between the disc and the linings 76 and 80.

The mechanism for maintaining the brake shoe 78 in position includes a pin 120 which extends through the housing wall 44 and is provided with elongated heads 122 and 124 at opposite ends thereof. The pin head 122 is seated against the bottom of a recess 125 formed in the brake shoe 78, while the head 124 bears against the outer side of a washer 126. A coil spring 128 surrounding the pin 120 is held in compression between the washer 126 and the outer surface of the housing wall 44. Thus, the spring 128 applies a force to the brake shoe 78 maintaining the brake shoe 78 in a position in which the stud heads 84 are seated fully within the recesses 82 provided on the outer side of the brake shoe 78.

The housing or caliper 10 can be formed as a casting with the openings 54 machined therein. The cylinders 56 are provided with annular radially outwardly extending flanges 130 on their inner ends, which engage annular shoulders 132 surrounding the openings 54 at the inner ends thereof for the purpose of transferring the reactive hydraulic forces acting against the cylinders 56 directly to the housing 10.

In operation, fluid pressure is introduced through the conduit 58 to the interconnected cylinders 56, where it acts against the pistons 60. The pistons 60 exert a force against the piston rods 66 which exert their force through the torque plate 52 to the brake shoe 74, causing the lining 76 to move into contact with the braking surface 92 of the disc 18. When braking contact is made, the cylinders 56 exert a force against the housing wall 42 in a direction away from the disc 18, causing the housing 10 to be pivoted in a direction in which the housing wall 44 and its adjacent brake shoe 78 are moved toward the braking surface 94 of the disc and the lining 80 is caused to engage the braking surface 94. It is to be noted that the axis of pivotal movement of the housing 10 is disposed in the midplane of the disc 18 and, thus, any tendency of the housing 10 to distort the disc 18 is minimized. It is to be appreciated, however, that some slight distortion of the braking surface 92 of the disc may occur through mechanical stress or thermal expansion, so that such surface will not be disposed in a perfect plane. For this purpose, the torque plate 52 is free to flex in an axial direction to permit unequal advancement of the piston rods 66 to maintain total braking contact between the lining 76 and the braking surface 92 at all points over the surface of the lining 76. Of course, the application of the brake causes the disc 18 to tend to carry the brake shoes 74 and 78 with the disc in a circumferential direction. The force thus exerted is known as "torque." In the case of the shoe 74, the torque is taken by the torque plate 52 at its point of pivotal support. Due to the fact that the pivot pin 50 is removed from the shoe 74 and has relatively small lubricated bearing areas, it exerts little frictional resistance to the advancement or retraction of the shoe 74 by the springs 104. It will also be seen that the piston rod 66 is free to pivot with respect to the piston and the torque plate 52. Thus, each of the piston rods 66 is free to accommodate itself to the pivotal movement of torque plate 52. The same is true with the brake shoe 78, where the torque is taken by the housing wall 44 through the studs 86 carried by the wall 44 which have their heads 84 seated within the recesses 82 of the brake shoe 78. After the lining material 76 and 80 has become worn, the screw 118 may be adjusted to reposition the adjusting pin 116 and maintain a relatively constant gap between the friction material and the adjacent braking surfaces of the disc, thereby avoiding excessive pedal takeup of the brake shoes upon brake application.

During repeated applications of any brake, a substantial quantity of heat is developed. The disc 18, with its vanes 96, also acts as a blower to enhance the rapid dissipation of this heat. Thus, any tendency of the brake to fade through overheating is minimized.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A disc brake including a rotatable disc, a nonrotatable housing having wall portions on opposite sides of said disc, a pair of circumferentially spaced cylinders on one of said wall portions, a brake shoe between said cylinders and said disc, a sheet metal torque plate disposed between the brake shoe and said cylinders with the plane of the sheet extending generally parallel to said disc, nonrotatable means supporting said torque plate for pivotal movement toward and away from said disc, means operable by fluid pressure in said cylinders for applying braking force to said torque plate, said torque plate being operable to transfer said braking force to said brake shoe, and interengaging abutment means on said torque plate and said brake shoe for the transfer of braking torque from said brake shoe to said torque plate.

2. The structure set forth in claim 1 in which said torque plate is provided with a radially inwardly extending recess in the outer edge thereof disposed in axial alignment with a radius extending between said cylinders whereby the outer portions of said torque plate in axial alignment with radii passing through said brake cylinders are unconnected at the radially outer periphery of the torque plate.

3. The structure set forth in claim 1 in which said housing is supported for pivotal movement with respect to said disc and said torque plate is pivotally mounted on said housing.

4. The structure set forth in claim 1 wherein said abutment means comprises a convex surface on said torque plate and a recess on the side of said brake shoe opposite from said disc conformably receiving said convex surface.

5. The structure set forth in claim 4 including a pin extending from said one wall of said housing through said torque plate into engagement with said brake shoe, and spring biasing means operatively associated with said pin whereby said pin is effective to apply a force to said brake shoe in opposition to the brake applying force of said cylinders to maintain said convex surface and said recess in interengagement.

References Cited in the file of this patent

UNITED STATES PATENTS

| | | |
|---|---|---|
| 2,655,227 | Eksergian | Oct. 13, 1953 |
| 2,655,229 | Eksergian | Oct. 13, 1953 |
| 3,016,111 | Lucien | Jan. 9, 1962 |
| 3,047,098 | Olley | July 31, 1962 |

FOREIGN PATENTS

| | | |
|---|---|---|
| 728,709 | Great Britain | Apr. 27, 1955 |
| 1,089,618 | France | Oct. 6, 1954 |
| 1,193,713 | France | May 4, 1959 |
| 1,238,036 | France | June 27, 1960 |